(12) United States Patent
Eran et al.

(10) Patent No.: US 7,797,016 B2
(45) Date of Patent: *Sep. 14, 2010

(54) WIRELESS LAN WITH CENTRAL MANAGEMENT OF ACCESS POINTS

(75) Inventors: Shpak Eran, Tel Aviv (IL); Oren Dvir, Ra'anana (IL)

(73) Assignee: Extricom Ltd., Herzeliya (IL)

( * ) Notice: Subject to any disclaimer, the term of this patent is extended or adjusted under 35 U.S.C. 154(b) by 1908 days.

This patent is subject to a terminal disclaimer.

(21) Appl. No.: 10/664,631

(22) Filed: Sep. 19, 2003

(65) Prior Publication Data

US 2004/0063455 A1    Apr. 1, 2004

Related U.S. Application Data

(63) Continuation-in-part of application No. 10/214,271, filed on Aug. 7, 2002.

(51) Int. Cl.
*H04B 7/00* (2006.01)

(52) U.S. Cl. ............... 455/525; 455/436; 455/439; 455/526; 370/310.2; 370/338; 370/343

(58) Field of Classification Search ......... 455/436–443, 455/500, 515, 524–526; 370/315, 322, 328, 370/330, 338, 343, 535, 401, 310.2
See application file for complete search history.

(56) References Cited

U.S. PATENT DOCUMENTS

| | | | |
|---|---|---|---|
| 4,581,734 A | 4/1986 | Olson et al. |
| 4,789,983 A | 12/1988 | Acampora et al. |
| 4,935,925 A | 6/1990 | Williams et al. |
| 5,280,472 A | 1/1994 | Gilhousen et al. |
| 5,570,352 A | 10/1996 | Poyhonen |
| 5,644,576 A | 7/1997 | Bauchot et al. |
| 5,696,903 A | 12/1997 | Mahany |
| 5,787,085 A | 7/1998 | Fox |
| 5,825,758 A | 10/1998 | Heikkinen et al. |
| 5,842,117 A | 11/1998 | Rosenberg et al. |

(Continued)

FOREIGN PATENT DOCUMENTS

DE    198 30 449    1/2000

(Continued)

OTHER PUBLICATIONS

ANSI/IEEE Standard 802.11 (1999 Edition), Part 11: Wireless LAN Medium Access Control (MAC) and Physical Layer (PHY) Specifications.

(Continued)

*Primary Examiner*—Tuan H Nguyen
(74) *Attorney, Agent, or Firm*—Husch Blackwell Sanders LLP Welsh & Katz (57) ABSTRACT

A method for mobile communication includes arranging a plurality of access points in a wireless local area network (WLAN) to communicate over the air with a mobile station using a common basic service set identification (BSSID) for all the access points. Upon receiving at one or more of the access points an uplink signal transmitted over the WLAN by the mobile station using the common BSSID, messages are sent and received over a communication medium linking the access points in order to select one of the access points to respond to the uplink signal. The selected one of the access points transmits a response to the mobile station.

38 Claims, 5 Drawing Sheets

U.S. PATENT DOCUMENTS

| | | |
|---|---|---|
| 5,912,921 A | 6/1999 | Warren et al. |
| 5,923,702 A | 7/1999 | Brenner et al. |
| 5,960,344 A | 9/1999 | Mahany |
| 5,982,779 A | 11/1999 | Krishnakumar et al. |
| 6,028,866 A | 2/2000 | Engel et al. |
| 6,047,175 A | 4/2000 | Trompower |
| 6,097,705 A | 8/2000 | Ben-Michael et al. |
| 6,192,026 B1 | 2/2001 | Pollack et al. |
| 6,196,456 B1 | 3/2001 | Taylor |
| 6,259,898 B1 | 7/2001 | Lewis |
| 6,295,461 B1 | 9/2001 | Palmer et al. |
| 6,381,458 B1 | 4/2002 | Frodigh et al. |
| 6,393,261 B1 | 5/2002 | Lewis |
| 6,393,262 B1 | 5/2002 | Muhlbauer et al. |
| 6,463,303 B1 | 10/2002 | Zhao |
| 6,505,045 B1 | 1/2003 | Hills et al. |
| 6,529,164 B1 | 3/2003 | Carter |
| 6,560,443 B1 | 5/2003 | Vaisanen et al. |
| 6,560,448 B1 | 5/2003 | Baldwin et al. |
| 6,567,396 B1 | 5/2003 | Pohjanvouri et al. |
| 6,580,704 B1 | 6/2003 | Wellig et al. |
| 6,590,884 B1 | 7/2003 | Panasik |
| 6,636,737 B1 | 10/2003 | Hills et al. |
| 6,671,284 B1 | 12/2003 | Yonge et al. |
| 6,671,495 B1 | 12/2003 | Lappetelainen et al. |
| 6,674,403 B2 | 1/2004 | Gray et al. |
| 6,675,015 B1 | 1/2004 | Martini et al. |
| 6,690,943 B1 | 2/2004 | Forde et al. |
| 6,711,148 B1 | 3/2004 | Hills |
| 6,732,163 B1 | 5/2004 | Halasz |
| 6,741,643 B1 | 5/2004 | Mcgibney |
| 6,771,933 B1 | 8/2004 | Eng et al. |
| 6,785,558 B1 | 8/2004 | Stratford et al. |
| 6,799,054 B2 | 9/2004 | Shpak |
| 6,801,767 B1 | 10/2004 | Schwartz et al. |
| 6,807,146 B1 | 10/2004 | McFarland |
| 6,823,177 B1 | 11/2004 | Lucidarme |
| 6,852,794 B2 | 2/2005 | Puhala et al. |
| 6,870,822 B2 | 3/2005 | Balogh |
| 6,907,229 B2 | 6/2005 | Shpak |
| 6,917,804 B2 | 7/2005 | Takayama et al. |
| 6,925,461 B2 | 8/2005 | Byers |
| 6,947,483 B2 | 9/2005 | Engwer |
| 6,965,942 B1 | 11/2005 | Young et al. |
| 6,968,198 B2 | 11/2005 | Nylund |
| 7,016,328 B2 * | 3/2006 | Chari et al. .................. 370/331 |
| 7,020,442 B2 | 3/2006 | Najafi et al. |
| 7,028,186 B1 | 4/2006 | Stenman et al. |
| 7,035,243 B2 | 4/2006 | Shpak |
| 7,046,690 B2 * | 5/2006 | Sherman ..................... 370/445 |
| 7,047,046 B2 | 5/2006 | Hoffmann et al. |
| 7,054,627 B1 | 5/2006 | Hillman |
| 7,113,498 B2 | 9/2006 | Bajic |
| 7,151,795 B1 | 12/2006 | Goldburg |
| 7,164,674 B2 | 1/2007 | Shpak |
| 7,173,922 B2 | 2/2007 | Beach |
| 7,177,661 B2 | 2/2007 | Shpak |
| 7,184,407 B1 * | 2/2007 | Myles et al. ................. 370/242 |
| 7,230,920 B1 | 6/2007 | Stratigakis |
| 7,289,463 B2 * | 10/2007 | Ozugur ....................... 370/328 |
| 7,292,562 B2 * | 11/2007 | Wu et al. ..................... 370/401 |
| 7,319,688 B2 | 1/2008 | Shpak |
| 7,330,734 B2 | 2/2008 | Shpak |
| 7,332,640 B2 | 2/2008 | Reyes et al. |
| 7,352,770 B1 | 4/2008 | Yonge et al. |
| 7,355,994 B2 | 4/2008 | Shpak |
| 7,386,298 B2 | 6/2008 | Beach |
| 7,391,757 B2 | 6/2008 | Haddad et al. |
| 2001/0055283 A1 | 12/2001 | Beach |
| 2002/0009982 A1 | 1/2002 | Kim |
| 2002/0048368 A1 | 4/2002 | Gardner |
| 2002/0061024 A1 | 5/2002 | Malkemes et al. |
| 2002/0080754 A1 | 6/2002 | Travostino et al. |
| 2002/0085719 A1 | 7/2002 | Crosbie |
| 2002/0093929 A1 | 7/2002 | Mangold et al. |
| 2002/0114303 A1 | 8/2002 | Crosbie et al. |
| 2002/0136183 A1 | 9/2002 | Chen et al. |
| 2002/0142771 A1 | 10/2002 | Saifullah et al. |
| 2002/0150098 A1 | 10/2002 | Sharony |
| 2002/0176386 A1 | 11/2002 | Singh |
| 2002/0188723 A1 | 12/2002 | Choi et al. |
| 2002/0197984 A1 | 12/2002 | Monin et al. |
| 2003/0003912 A1* | 1/2003 | Melpignano et al. ........ 455/436 |
| 2003/0007475 A1 | 1/2003 | Tsuda et al. |
| 2003/0012174 A1 | 1/2003 | Bender et al. |
| 2003/0014624 A1 | 1/2003 | Maturana et al. |
| 2003/0063593 A1 | 4/2003 | Koyanagi et al. |
| 2003/0117973 A1 | 6/2003 | Thermond et al. |
| 2003/0133422 A1 | 7/2003 | Bims |
| 2003/0137959 A1 | 7/2003 | Nekiber et al. |
| 2003/0161340 A1 | 8/2003 | Sherman |
| 2003/0174681 A1 | 9/2003 | Gilberton et al. |
| 2003/0181221 A1 | 9/2003 | Nguyen |
| 2003/0193946 A1 | 10/2003 | Gernert et al. |
| 2003/0206532 A1 | 11/2003 | Shpak |
| 2003/0207699 A1 | 11/2003 | Shpak |
| 2003/0210674 A1* | 11/2003 | Honkasalo et al. .......... 370/338 |
| 2003/0227892 A1 | 12/2003 | Cabana |
| 2003/0227893 A1* | 12/2003 | Bajic .......................... 370/338 |
| 2003/0235170 A1 | 12/2003 | Trainin |
| 2004/0013135 A1 | 1/2004 | Haddad |
| 2004/0022176 A1 | 2/2004 | Hashimoto et al. |
| 2004/0052241 A1 | 3/2004 | Martin et al. |
| 2004/0063455 A1 | 4/2004 | Eran et al. |
| 2004/0076134 A1 | 4/2004 | Barber et al. |
| 2004/0077353 A1 | 4/2004 | Mahany |
| 2004/0103204 A1 | 5/2004 | Yegin |
| 2004/0141522 A1 | 7/2004 | Texerman et al. |
| 2004/0156399 A1 | 8/2004 | Eran |
| 2004/0157624 A1* | 8/2004 | Hrastar ....................... 455/456.1 |
| 2004/0160929 A1 | 8/2004 | Shpak |
| 2004/0162037 A1 | 8/2004 | Shpak |
| 2004/0170154 A1 | 9/2004 | Carter et al. |
| 2004/0184475 A1 | 9/2004 | Meier |
| 2004/0203740 A1* | 10/2004 | Won et al. .................. 455/426.1 |
| 2004/0204105 A1 | 10/2004 | Liang et al. |
| 2004/0223469 A1 | 11/2004 | Bahl et al. |
| 2004/0252696 A1 | 12/2004 | Kakishima et al. |
| 2004/0267896 A1 | 12/2004 | Patel et al. |
| 2005/0018630 A1 | 1/2005 | Bianchi et al. |
| 2005/0021586 A1 | 1/2005 | Bichot et al. |
| 2005/0054370 A1 | 3/2005 | Shpak |
| 2005/0063349 A1 | 3/2005 | LoGalbo et al. |
| 2005/0117524 A1 | 6/2005 | Lee et al. |
| 2005/0170824 A1 | 8/2005 | Dowling |
| 2005/0180314 A1 | 8/2005 | Webster et al. |
| 2005/0195786 A1 | 9/2005 | Shpak |
| 2006/0025150 A1 | 2/2006 | Kim et al. |
| 2006/0187952 A1 | 8/2006 | Kappes et al. |
| 2006/0203772 A1 | 9/2006 | Laroia et al. |
| 2006/0209771 A1 | 9/2006 | Shpak |
| 2007/0019583 A1 | 1/2007 | Laroia et al. |
| 2007/0286143 A1 | 12/2007 | Olson et al. |
| 2008/0112373 A1 | 5/2008 | Shpak et al. |
| 2008/0175265 A1 | 7/2008 | Yonge et al. |

FOREIGN PATENT DOCUMENTS

| | | |
|---|---|---|
| EP | 0 955 565 | 11/1999 |
| EP | 1133129 A2 | 9/2001 |
| JP | 63009332 A | 1/1988 |
| JP | 3102843 A | 4/1991 |
| JP | 4027238 A | 1/1992 |
| JP | 5198268 A | 8/1993 |

| | | | |
|---|---|---|---|
| JP | 10124445 A | 5/1998 |
| JP | 2000022712 A | 1/2000 |
| JP | 2000152330 A | 5/2000 |
| JP | 2001 027700 | 1/2001 |
| JP | 2001016163 A | 1/2001 |
| WO | 0163842 A1 | 8/2001 |
| WO | 02/071627 A2 | 9/2002 |
| WO | 02091623 A1 | 11/2002 |
| WO | WO 02/091623 | 11/2002 |
| WO | 2004015886 A1 | 2/2004 |
| WO | 2004015888 A1 | 2/2004 |
| WO | 2008059504 A2 | 5/2008 |

OTHER PUBLICATIONS

Kerry S J et al., "Liaison statement on the compatibility between IEEE 802.11a and radars in the radiolocation and radionavigation service in the 5250-5350 MHz and 5470-5735 MHz bands", Internet Citation [online], Jan. 17, 2001.

IEEE: "IEEE 802.11h: Amendment 5: Spectrum and Transmit Power Management Extensions in the 5 GHz band in Europe", IEEE STD 802.11H, Oct. 14, 2003.

Crow B P et al., "IEEE 802.11 Wireless Local Area Networks", IEEE Communications Magazine, IEEE Service Center, New York, US, vol. 35, No. 9, Sep. 1997. pp. 116-126.

Jim Lansford, et al., "Wi-Fi (802.11b) and Bluetooth: Enabling Coexistence", IEEE Network, IEEE Service Center, New York, US, vol. 15, No. 5, Sep. 2001, pp. 20-27.

Arai et al., "A hybrid indoor data network with radio and wire performance evaluation in a Rayleigh channel", Proceedings of the 11th Annual International Phoenix Conference on Computers and Communications, pp. 255-259, Scottsdale, USA, Apr. 1-3, 1992.

U.S. Appl. No. 11/202,256 Official Action dated Sep. 11, 2008.

U.S. Appl. No. 11/202,256 Official Action dated Jul. 7, 2009.

U.S. Appl. No. 10/764,963 Official Action dated Feb. 23, 2007.

U.S. Appl. No. 10/764,963 Official Action dated Sep. 24, 2007.

U.S. Appl. No. 10/764,963 Official Action dated Jan. 25, 2008.

U.S. Appl. No. 10/764,963 Official Action dated Oct. 14, 2008.

Atheros Communications "Atheros Third-Generation Wireless LAN Technology Boosts Performance and Range, Reduces Power and Cost", Press Release, Sunnyvale, USA, Jun. 3, 2003.

IEEE Standard 802.1D "Part 3: Media Access Control (MAC) Bridges", LAN/MAN Standards Committee of the IEEE Computer Society, 1998 Edition.

Japanese Patent Application No. 2004527261 Official Action dated Dec. 24, 2008.

Japanese Patent Application No. 2006502640 Official Action dated Aug. 18, 2009.

European Patent Application No. 03741040.4 Official Action dated Jan. 15, 2009.

Japanese Patent Application No. 2004527260 Official Action dated Jan. 27, 2009.

European Patent Application No. 03808853.0 Official Action dated Apr. 23, 2009.

* cited by examiner

WIRELESS LAN WITH CENTRAL MANAGEMENT OF ACCESS POINTS

CROSS-REFERENCE TO RELATED APPLICATION

This application is a continuation-in-part of U.S. patent application Ser. No. 10/214,271, filed Aug. 7, 2002, which is assigned to the assignee of the present patent application and whose disclosure is incorporated herein by reference.

FIELD OF THE INVENTION

The present invention relates generally to wireless communications, and specifically to methods and devices for improving the performance of wireless local area networks.

BACKGROUND OF THE INVENTION

Wireless local area networks (WLANs) are gaining in popularity, and new wireless applications are being developed. The original WLAN standards, such as "Bluetooth" and IEEE 802.11, were designed to enable communications at 1-2 Mbps in a band around 2.4 GHz. More recently, IEEE working groups have defined the 802.11a, 802.11b and 802.11g extensions to the original standard, in order to enable higher data rates. The 802.11a standard, for example, envisions data rates up to 54 Mbps over short distances in a 5 GHz band, while 802.11b defines data rates up to 22 Mbps in the 2.4 GHz band. In the context of the present patent application and in the claims, the term "802.11" is used to refer collectively to the original IEEE 802.11 standard and all its variants and extensions, unless specifically noted otherwise.

The theoretical capability of new WLAN technologies to offer high communication bandwidth to mobile users is severely hampered by the practical limitations of wireless communications. Indoor propagation of radio frequencies is not isotropic, because radio waves are influenced by building layout and furnishings. Therefore, even when wireless access points are carefully positioned throughout a building, some "black holes" generally remain—areas with little or no radio reception. Furthermore, 802.11 wireless links can operate at full speed only under conditions of high signal/noise ratio. Signal strength scales inversely with the distance of the mobile station from its access point, and therefore so does communication speed. A single mobile station with poor reception due to distance or radio propagation problems can slow down WLAN access for all other users in its basic service set (BSS—the group of mobile stations communicating with the same access point in a conventional 802.11 WLAN).

The natural response to these practical difficulties would be to distribute a greater number of access points within the area to be served. If a WLAN receiver receives signals simultaneously from two sources of similar strength on the same frequency channel, however, it is generally unable to decipher either signal. The 802.11 standard provides a mechanism for collision avoidance known as clear channel assessment (CCA), which requires a station to refrain from transmitting when it senses other transmissions on its frequency channel. In practice, this mechanism is of limited utility and can place a heavy burden on different BSSs operating on the same frequency channel.

Therefore, in 802.11 WLANs known in the art, access points in mutual proximity must use different frequency channels. Theoretically, the 802.11b and 802.11g standards define 14 frequency channels in the 2.4 GHz band, but because of bandwidth and regulatory limitations, WLANs operating according to these standards in the United States actually have only three different frequency channels from which to choose. (In other countries, such as Spain, France and Japan, only one channel is available.) As a result, in complex, indoor environments, it becomes practically impossible to distribute wireless access points closely enough to give strong signals throughout the environment without substantial overlap in the coverage areas of different access points operating on the same frequency channel.

SUMMARY OF THE INVENTION

The present invention provides methods and devices for enhancing the coverage and speed of WLAN systems. In embodiments of the present invention, a WLAN system comprises multiple wireless access points distributed within a service region. The access points communicate with mobile stations in the service region in accordance with one or more of the 802.11 standards. In order to provide complete coverage of the service region, with strong communication signals throughout the region, the access points may be closely spaced, and their areas of coverage may substantially overlap one another. The access points are linked by a communication medium, such as a wired LAN, to an access point manager, which coordinates and controls the operations of the access points as described hereinbelow.

In embodiments of the present invention, all the access points that operate on a given frequency channel within a given service region belong to the same basic service set (BSS) and thus share the same BSS identification (BSSID). (By contrast, in 802.11 WLAN systems known in the art, each BSS includes only a single access point.) Therefore, in these embodiments, any of the access points that are within range of a given mobile station are capable of receiving and responding to uplink messages (also referred to as uplink signals) from the mobile station. These access points forward uplink management and broadcast messages to the access point manager, which selects one of the access points to respond to the mobile station and to receive subsequent data messages from the mobile station. The access point manager assigns one access point to serve each mobile station in the WLAN. Problems of overlapping coverage areas and collisions are thus resolved, typically in favor of the access point that has the strongest reception of uplink signals from the mobile station in question. The access points may therefore be deployed within the service region as closely as desired, so that mobile stations everywhere in the service region experience good radio coverage and can operate at optimal speed.

In the above-mentioned parent application (U.S. Ser. No. 10/214,271), multiple access points operating on the same frequency channel similarly share the same BSSID. That application defines an arbitration procedure, whereby the access points communicate among themselves in order to select the access point that is to respond to each uplink message. Embodiments of the present invention provide an alternative solution, in which the access point manager selects the access point to respond to the mobile station. This solution reduces the computational demands on the access points that are associated with BSSID sharing, and may be implemented in pre-existing WLAN installations and other WLANs using legacy access point hardware. This alternative solution, however, introduces additional latency in the process of selecting the access point that is to respond to an uplink message from a mobile station. Therefore, the access point is selected once at the initiation of communications, and changes thereafter only occasionally, as described below.

In order to reduce latency in responding to uplink data messages, each access point is assigned its own address, typically a medium access control (MAC) address, in addition to the BSSID. Once a mobile station has connected to the WLAN and associated itself with the BSS, the selected access point transmits a downlink message to the mobile station, instructing the mobile station to direct all uplink data messages to the address of the selected access point. This downlink message may be generated using a standard network control protocol, such as the well-known Address Resolution Protocol (ARP), so that no special programming of either the mobile station is required for this purpose. The access point to which the subsequent uplink messages are directed will immediately acknowledge such messages, while other access points (with different network addresses) will ignore them. If the mobile station changes position, or network conditions change, the access point manager may select a different access point to respond to subsequent communications with the mobile station. In this case, the mobile station is "handed over" to the new access point by means of a downlink message instructing the mobile station to direct subsequent uplink data messages to the address of the new access point.

Although the embodiments described herein make reference to the 802.11 family of standards and use terminology taken from these standards, the principles of the present invention may similarly be applied in wireless LANs of other types, based on other standards and communication protocols.

There is therefore provided, in accordance with an embodiment of the present invention, a method for mobile communication, including:

arranging a plurality of access points in a wireless local area network (WLAN) to communicate over the air with a mobile station using a common basic service set identification (BSSID) for all the access points;

receiving at one or more of the access points an uplink signal transmitted over the WLAN by the mobile station using the common BSSID;

sending and receiving messages over a communication medium linking the access points in order to select one of the access points to respond to the uplink signal; and transmitting a response from the selected one of the access points to the mobile station.

Typically, the access points are configured to communicate with the mobile station over a common frequency channel shared by all the access points. The access points have respective service areas, and may be arranged so that the service areas substantially overlap. In disclosed embodiments, the access points are arranged to communicate with the mobile station substantially in accordance with IEEE Standard 802.11.

In disclosed embodiments, arranging the plurality of the access points includes assigning a respective medium access control (MAC) address to each of the access points, so that each of the access points ignores uplink data messages that are not addressed to the respective MAC address. Typically, arranging the plurality of the access points includes configuring the access points to emulate mobile station communications, so that each of the access points acknowledges the uplink data messages that are addressed from the mobile station to the respective MAC address. Sending and receiving the messages may include reconfiguring the selected one of the access points temporarily to stop emulating the mobile station communications, so as to transmit an acknowledgment to a management frame transmitted by the mobile station. Additionally or alternatively, sending and receiving the messages may include changing the respective MAC address of the selected one of the access points temporarily, so as to cause the selected one of the access points to transmit an acknowledgment to a management frame transmitted by the mobile station.

Typically, transmitting the response includes instructing the mobile station to transmit all the uplink data messages to the respective MAC address of the selected one of the access points. Instructing the mobile station may include sending an Address Resolution Protocol (ARP) response to the mobile station. In a disclosed embodiment, the method includes, subsequently to transmitting the response from the selected one of the access points, and responsively to a further uplink signal received from the mobile station, selecting a further one of the access points to communicate with the mobile station, and sending a spoofed ARP response to the mobile station instructing the mobile station to transmit all further uplink data messages to the respective MAC address of the further one of the access points.

Typically, receiving the uplink signal includes measuring a strength of the uplink signal at each of the one or more of the access points, and sending and receiving the messages includes indicating in the messages the measured strength of the uplink signal, and selecting the one of the access points to respond to the uplink signal responsively to the strength indicated in the messages. Optionally, measuring the strength includes measuring the strength repeatedly in response to subsequent uplink signals transmitted by the mobile station, and selecting the one of the access points includes selecting a different one of the access points to respond to the subsequent uplink signals, responsively to a change in the measured strength.

There is also provided, in accordance with an embodiment of the present invention, a method for mobile communication, including:

arranging a plurality of access points in a wireless local area network (WLAN) to communicate over the air on a common frequency channel with a mobile station;

receiving at one or more of the access points an uplink signal transmitted over the WLAN by the mobile station on the common frequency channel;

conveying messages responsively to the uplink signal from the one or more of the access points over a communication medium linking the access points to a manager node;

processing the messages at the manager node so as to select one of the access points to respond to the uplink signal; and transmitting a response from the selected one of the access points to the mobile station.

In some embodiments, the manager node includes a plurality of management processors. Typically, the plurality of management processors includes a control processor and a packet processor, and processing the messages includes selecting the one of the access points to respond to the uplink signal using the control processor, and further includes processing uplink data packets received by the selected one of the access points using the packet processor. Processing the uplink data packets may include decrypting the uplink data packets and encrypting downlink data packets at the packet processor, for transmission by the selected one of the access points. Additionally or alternatively, processing the messages includes distributing the messages for processing among the plurality of the management processors.

There is additionally provided, in accordance with an embodiment of the present invention, apparatus for mobile communication, including:

a plurality of access points, which are arranged in a wireless local area network (WLAN) to communicate over the air on a common frequency channel with a mobile station using a common basic service set identification (BSSID) for all the access points, and which are adapted, upon receiving at one or more of the access points an uplink signal transmitted over the WLAN by the mobile station on the common frequency channel, to convey messages responsively to the uplink signal from the one or more of the access points over a communication medium linking the access points; and a manager node, linked to the communication medium, which is adapted to process the messages so as to select one of the access points to respond to the uplink signal, and to instruct the selected one of the access points to transmit a response to the mobile station.

The present invention will be more fully understood from the following detailed description of the embodiments thereof, taken together with the drawings in which:

DETAILED DESCRIPTION OF EMBODIMENTS

Figure 1:
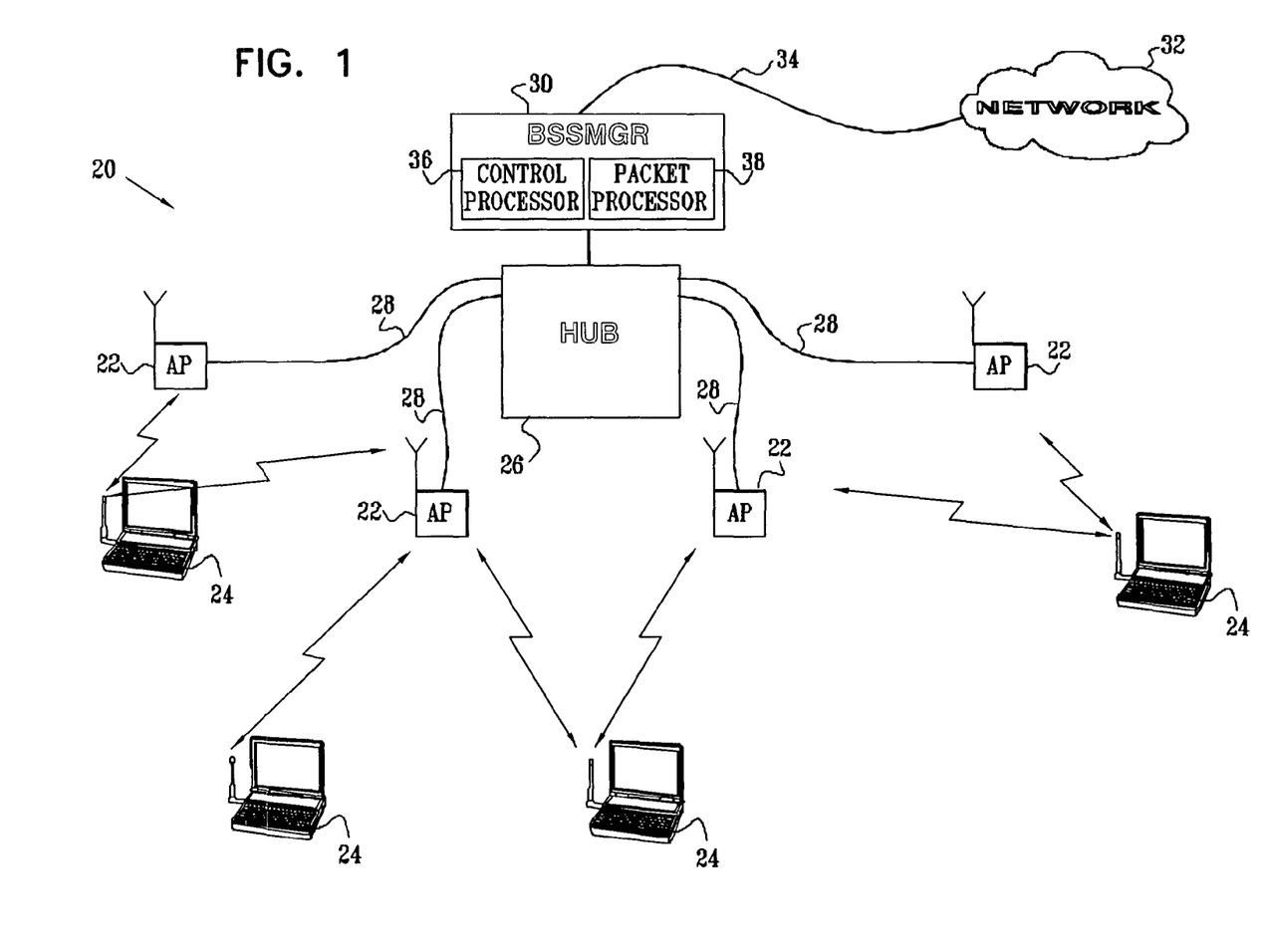
FIG. 1 is a block diagram that schematically illustrates a WLAN system, in accordance with a preferred embodiment of the present invention.

FIG. 1 is a block diagram that schematically illustrates a wireless LAN (WLAN) system 20, in accordance with a preferred embodiment of the present invention. System 20 comprises multiple access points 22, which are configured for data communication with mobile stations 24. The mobile stations typically comprise computing devices, such as desktop, portable or handheld devices. In the exemplary embodiments described hereinbelow, it is assumed that the access points and mobile stations communicate with one another in accordance with one of the standards in the IEEE 802.11 family and observe the 802.11 medium access control (MAC) layer conventions. Details of the 802.11 MAC layer are described in ANSI/IEEE Standard 801.11 (1999 Edition), and specifically in *Part 11: Wireless LAN Medium Access Control (MAC) and Physical Layer (PHY) Specifications*, which is incorporated herein by reference. The principles of the present invention, however, are not limited to the 802.11 standards, and may likewise be applied to substantially any type of WLAN, including HiperLAN, Bluetooth and hiswan-based systems.

Access points 22 are connected by a communication medium, typically comprising a wired LAN 28 with a hub 26, typically an Ethernet switching hub. LAN 28 serves as the distribution system (DS) for exchanging data between the access points and the hub. Hub 26 connects the access points to a node on LAN 28 that serves as an access point manager 30, which is also referred to hereinbelow as a BSS manager (BSSMGR). Manager 30 typically comprises a computer, operating under the control of software suitable for carrying out the functions described hereinbelow. The software may be downloaded to manager 30 in electronic form, or it may alternatively be provided on tangible media, such as CD-ROM. Alternatively or additionally, manager 30 may comprise dedicated hardware circuits in order to accelerate the performance of its functions. Typically, manager 30 is also linked to an external network 32, such as the Internet, via an access line 34, so as to enable mobile stations 24 to send and receive data through access points 22 to and from the external network.

Although manager 30 is shown and described here as a single unit, in practice, the functions of the manager may be divided among two or more units, which may occupy separate nodes in system 20. For example, manager 30 may be split into two logical entities: a control processor 36 for handling management traffic (such as the association process, access point selection and handovers, as described hereinbelow), and a packet processor 38 for handling data traffic to and from access points 22. The packet processor (whether integrated with or separate from the control processor) may also perform packet encryption and decryption functions, which are typically performed by the access points themselves in WLAN systems known in the art. The control processor and packet processor may be contained physically in a single box or in separate boxes. If separate boxes are used, then at least the packet processor is preferably connected to LAN 28, for rapid communication with the access points. The control processor may be more remotely located, if desired, with an appropriate communication link between the packet and control processors.

Furthermore, some or all of the functions of manager 30 may be distributed among a plurality of manager nodes or packet processors. This distributed functionality has the potential advantages of redundancy, making system 20 immune to a single point of failure, and reduced bandwidth requirements, by splitting packet traffic among different processors. When multiple packet processors 38 are used, for example, each mobile station 24 may be assigned to one of the packet processors in order to balance the computational load among the processors. This assignment of packet processors 38 to mobile stations 24 may be performed by control processor 36, which then informs access points 22 of the packet processor that is assigned to serve each mobile station.

Notwithstanding the possibilities of functional and physical separation of manager 30 into multiple separate units, in the embodiments described below manager 30 is treated as a single functional unit for the sake of conceptual simplicity and clarity.

Access points 22 in system 20 are preferably closely spaced, operate on a common frequency channel, and share a common BSSID. For increased capacity, system 20 may include other, similar groups of access points (not shown in the figure), operating on other frequency channels, to the extent permitted by the applicable WLAN standard and regulatory regulations. Each of these groups has its own BSSID and operates in a substantially identical manner to that described hereinbelow with respect to access points 22. These other groups of access points may be connected to the same LAN 28 and may be managed by the same manager 30, or they may be managed independently by another manager. In any case, because they operate on different frequency channels, the different groups operate substantially independently of one another and may be regarded as separate systems. It is therefore sufficient to describe the operation of a single group, as shown in FIG. 1, in order to provide an understanding of the present invention.

Since access points 22 operate on the same frequency channel, radio waves may typically reach mobile station 24 from multiple access points simultaneously on this frequency channel. By the same token, uplink radio messages transmitted by mobile station 24 may be received at about the same time by multiple access points. In WLAN systems known in the art, under these circumstances, mobile station 24 would receive downlink acknowledgment and response messages from two or more of the access points, which would probably result in inability of the mobile station to communicate with any of the access points. In embodiments of the present invention, manager 30 resolves this conflict by selecting one of access points 22 a priori to communicate with each mobile station (usually the closest access point to the mobile station, meaning the access point that received the uplink signal with the highest signal strength). Manager 30 conveys response instructions to the selected access point over LAN 28, as described hereinbelow. The other access points meanwhile refrain from interfering.

Implementing this mode of operation requires modifying the behavior of the access points, relative to 802.11 access points known in the art. The 802.11 standard provides that an access point should acknowledge and respond to all uplink messages that are directed to the BSSID of the access point. Thus, if access points 22 were configured in the conventional manner, all the access points would acknowledge the uplink messages from mobile stations 24, without waiting for instructions from manager 30.

To overcome this limitation, while still using conventional WLAN hardware, access points 22 are configured to emulate mobile stations and are assigned their own, unique MAC addresses. Some off-shelf WLAN interface chips, such as WLAN chipsets produce by Atheros Communications (Sunnyvale, Calif.), permit this reconfiguration to be carried out by an appropriate firmware command to the chip. Access points using this chipset, which may be adapted to operate in system 20, include the WLAN AP 8500 or 8700 access points produced by 3COM (Santa Clara, Calif.) and the Orinoco AP-600a, AP-600g and AP-2000 access points produced by Proxim Corporation (Sunnyvale, Calif.). When configured to emulate mobile stations in this manner, each access point 22 acknowledges uplink data messages only when the data messages are directed to its assigned MAC address, and passes these messages over LAN 28 to manager 30. The access point in this configuration ignores uplink data messages that are directed to other MAC addresses, except to measure the signal strengths of these uplink transmissions, as described below. The access point still receives and passes on control and management uplink messages over LAN 28 to manager 30, however, since these messages contain a special MAC address, equal to the BSSID of the access point.

The use of conventional WLAN hardware to achieve the novel functionality of the present invention is generally advantageous in reducing the cost of system 20. Alternatively, access points 22 may comprise custom or semi-custom hardware, designed for the purposes of the present invention. In any case, the novel operation of system 20 is transparent to mobile stations 24, which operate in accordance with the 802.11 standard without modification.

Figure 2A:
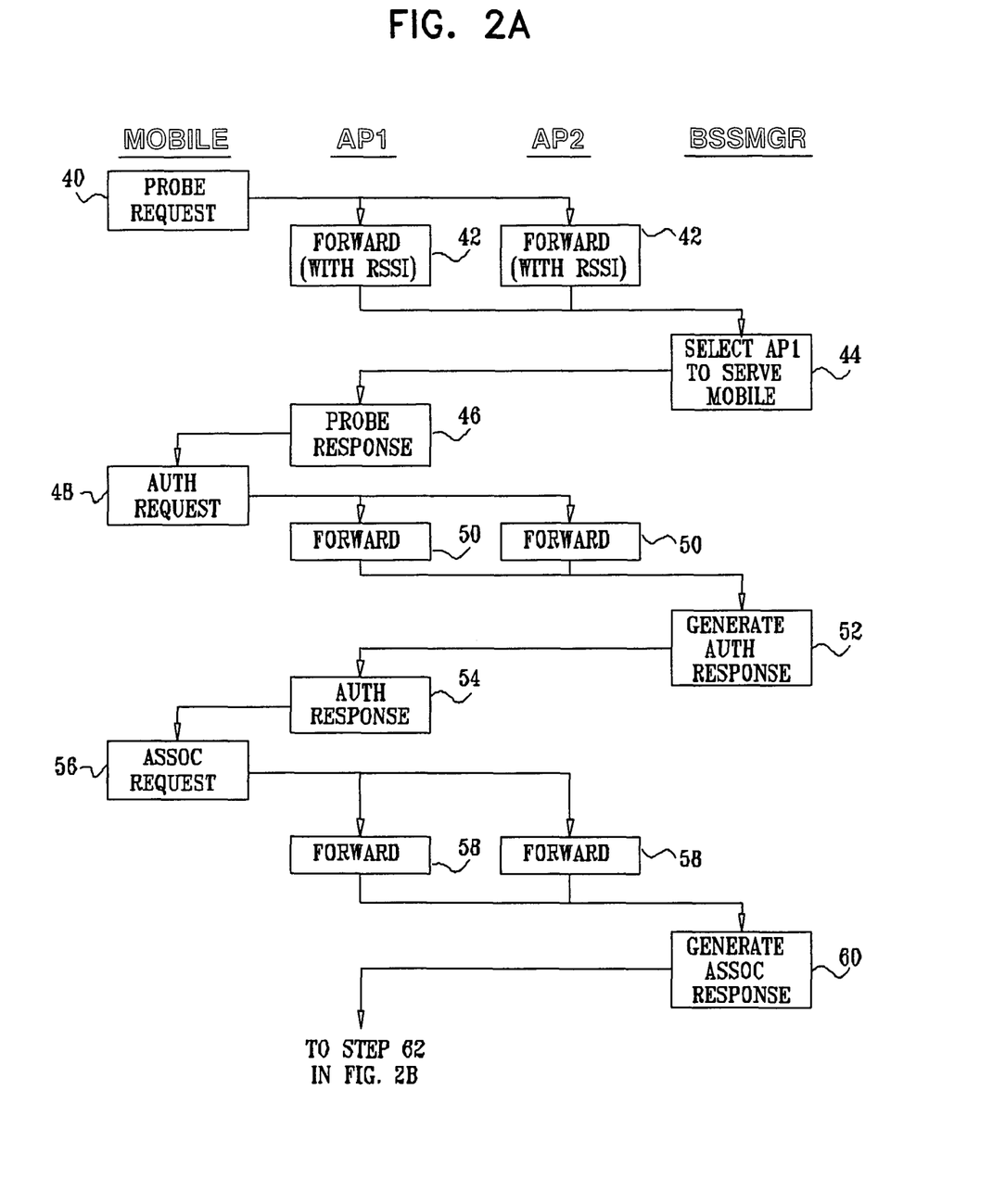
FIGS. 2A and 2B are a flow chart that schematically illustrates a method for communication between a mobile station and access points in a WLAN system, in accordance with an embodiment of the present invention.
Figure 2B:
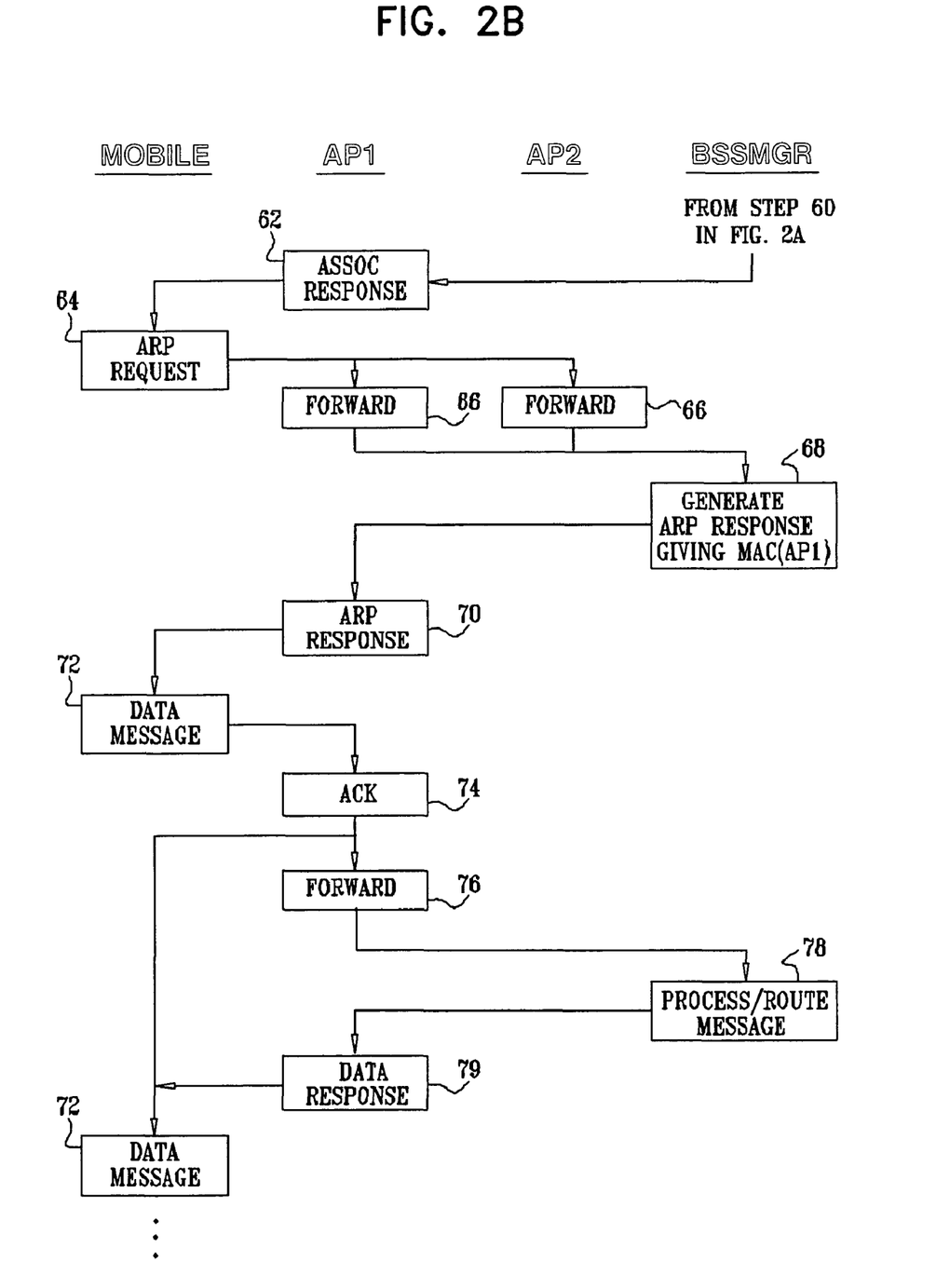

FIGS. 2A and 2B are a flow chart that schematically illustrates communication between mobile station 24 and access points 22 in system 20, in accordance with an embodiment of the present invention. The flow chart is arranged to show the sequence of messages and associated actions performed by the mobile station, by two access points (identified arbitrarily AP1 and AP2), and by manager 30 (BSSMGR). For the sake of simplicity, only these two access points are represented in this figure, and AP1 is selected by manager 30 to respond to mobile station 24. In practice, this method is typically carried out over a larger group of access points.

Communication between mobile station 24 and access points 22 under the 802.11 standard begins with a probe request 40, in order to identify available access points to which the mobile station may connect. Access points 22 that receive this request typically measure the strength of the signal. The access points then forward the probe request to manager 30, at a forwarding step 42. Optionally, the access points forward a received signal strength indication (RSSI) together with the probe request. Alternatively, RSSI measurements may be sent periodically, and not for every packet received, in order to reduce bandwidth consumption on LAN 28.

Manager 30 selects an access point (AP1 in the present example) to respond to mobile station 24, at an access point selection step 44. Typically, the access point reporting the strongest RSSI for a given mobile station is in the best position to communicate with that mobile station at the highest supportable data rate, and the manager therefore chooses this access point to respond to the mobile station. Alternatively, manager 30 may initially select at random the access point that is to respond to probe request 40, and may subsequently appoint a new access point to communicate with the mobile station based on the RSSI. As noted above, the access points typically measure the strength of the signal for every uplink packet they receive, and then periodically transmit the updated RSSI measurements to manager 30, which may lead the manager to change the access point that is selected to respond to a given mobile station. Alternatively or additionally, the manager may take other factors into consideration, such as load balancing among the access points, in order to select the access point to respond in each case. In any case, selection of the access point in this manner, from among access points closely within the service region of system 20, allows the mobile stations to communicate over the WLAN system with generally better signal quality, and therefore higher data rates, than in WLAN systems known in the art.

Upon selecting access point AP1 to respond to the probe request at step 44, manager 30 generates an appropriate response and conveys the response to the selected access point. AP1 returns a probe response 46, as instructed by manager 30, to mobile station 24. Other access points do not respond. The mobile station then submits an authentication request 48, in accordance with the 802.11 standard. The authentication request specifies the BSSID which, as noted above, is shared by both AP1 and AP2. Therefore, the authentication request is, again, received by both AP1 and AP2, and forwarded to manager 30 at a forwarding step 50.

According to the 802.11 standard, after submitting request 48, the mobile station will expect to receive an acknowledgment (ACK) from the appropriate access point within a short period, typically 10 µs If the acknowledgment is not received in time, the mobile station will retransmit the association request until it receives a response. If no response is received within a predetermined time period, the mobile station will treat the association request as having failed. The cycle of forwarding association requests (and other messages) to manager 30 and waiting for the manager to respond typically takes longer than the 10 µs maximum set by the standard. An optional procedure for dealing with this delay, in order to reduce the number of retransmissions and avoid failures due to timeout, is described below with reference to FIG. 4.

In reply to authentication request 48, manager 30 generates the appropriate authentication response and passes response instructions to the selected access point (AP1), at a response generation step 52. AP1 then returns an authentication response 54 to mobile station 24, indicating that the mobile station is authorized to continue communications with the WLAN system.

The next step in the 802.11 communication management process is for mobile station 24 to submit an association request 56, asking to be associated with the BSS of access points 22. This request also specifies the BSSID shared by AP1 and AP2. The access points forward the association request to manager 30 for processing, at a forwarding step 58. If necessary, AP1 may be prompted to return an acknowledgment, as noted above and shown in FIG. 4. In reply to the association request, manager 30 generates the appropriate association response and passes response instructions to AP1, at a response generation step 60. AP1 accordingly returns an association response 62 to mobile station 24. The mobile station is now ready to begin data communications with system 20. Optionally, data communications may be preceded by additional management-related communication steps, such as exchange of EAPOL (Extensible Authentication Protocol Over LAN) packets between mobile station 24 and access points 22, as is known in the art. These additional steps are handled in similar manner to the association steps described above.

As a precursor to application-level data communications, mobile station 24 must typically first ascertain the network address of the destination server or peer computer with which it wishes to communicate. The mobile station must also determine the MAC address of the destination or of the router through which packets to this destination should be sent (if the destination is outside the subnet in which the mobile station is located). Various protocols are known in the art for this purpose. Probably the most commonly-used protocol of this type is the well-known Address Resolution Protocol (ARP), which is described by Plummer in Request for Comments (RFC) 826 of the Internet Engineering Task Force (IETF), entitled "An Ethernet Address Resolution Protocol" (1982), which is incorporated herein by reference. Given a particular Internet Protocol (IP) destination address, ARP determines the MAC address to which packets to this IP address should be forwarded. Although ARP relates specifically to IP and Ethernet addressing, other, similar protocols are known in the art for resolving other network layer (Layer 3) and MAC layer (Layer 2) addressing schemes. Therefore, although certain techniques are described hereinbelow with reference to ARP, these techniques may be extended in a straightforward manner to other protocols and addressing schemes.

Mobile station 24 sends an ARP request 64 in order to determine the MAC address to which it should send data packets destined for a certain IP address. The ARP request is contained in a data frame sent over the WLAN, with a broadcast MAC address, as is known in the art. Therefore, both AP1 and AP2 (and other access points receiving the ARP request) forward the request to manager 30, at a forwarding step 66. Manager 30 generates ARP response instructions, at a response generation step 68. The ARP response to mobile station 64 informs the mobile station that the MAC address to which data packets to the desired IP address should be sent is the MAC address of the selected access point, AP1. Access point AP1 returns the appropriate ARP response 70 to the mobile station. All subsequent ARP requests by the mobile station, with respect to other IP addresses, receive the same response. In this manner, all entries in the ARP table of each mobile station 24 will be made to contain the same MAC address—that of the access point that was selected to serve the particular mobile station.

Having resolved the required MAC address, mobile station 24 can now send a data message 72 to this address. The data message comprises a packet, such as an IP packet with the appropriate IP destination address, encapsulated in a MAC frame with the MAC destination address of AP1. When access point AP1 receives this message, it ascertains that the MAC destination address matches its own assigned address, and immediately sends an acknowledgment (ACK) 74 back to the mobile station. Other access points ignore message 72, since it is not addressed to their MAC addresses. AP1 forwards the data message to manager 30 for processing, at a forwarding step 76. Manager 30 processes the message at a message processing step 78. Typically, the manager reads the IP destination address (or other network address) in the packet header in order to determine whether the data message should be routed or bridged to another node in system 20, such as another one of mobile stations 24, or should be routed or bridged out of system 20 to network 32.

In either case, when manager 30 receives a reply to message 72 (or other incoming data for mobile station 24), it passes the reply to the selected access point, AP1, which then transmits a data response 79 to the mobile station. The mobile station may send additional data messages, including further ARP requests, which are handled in the manner described above.

Figure 3:
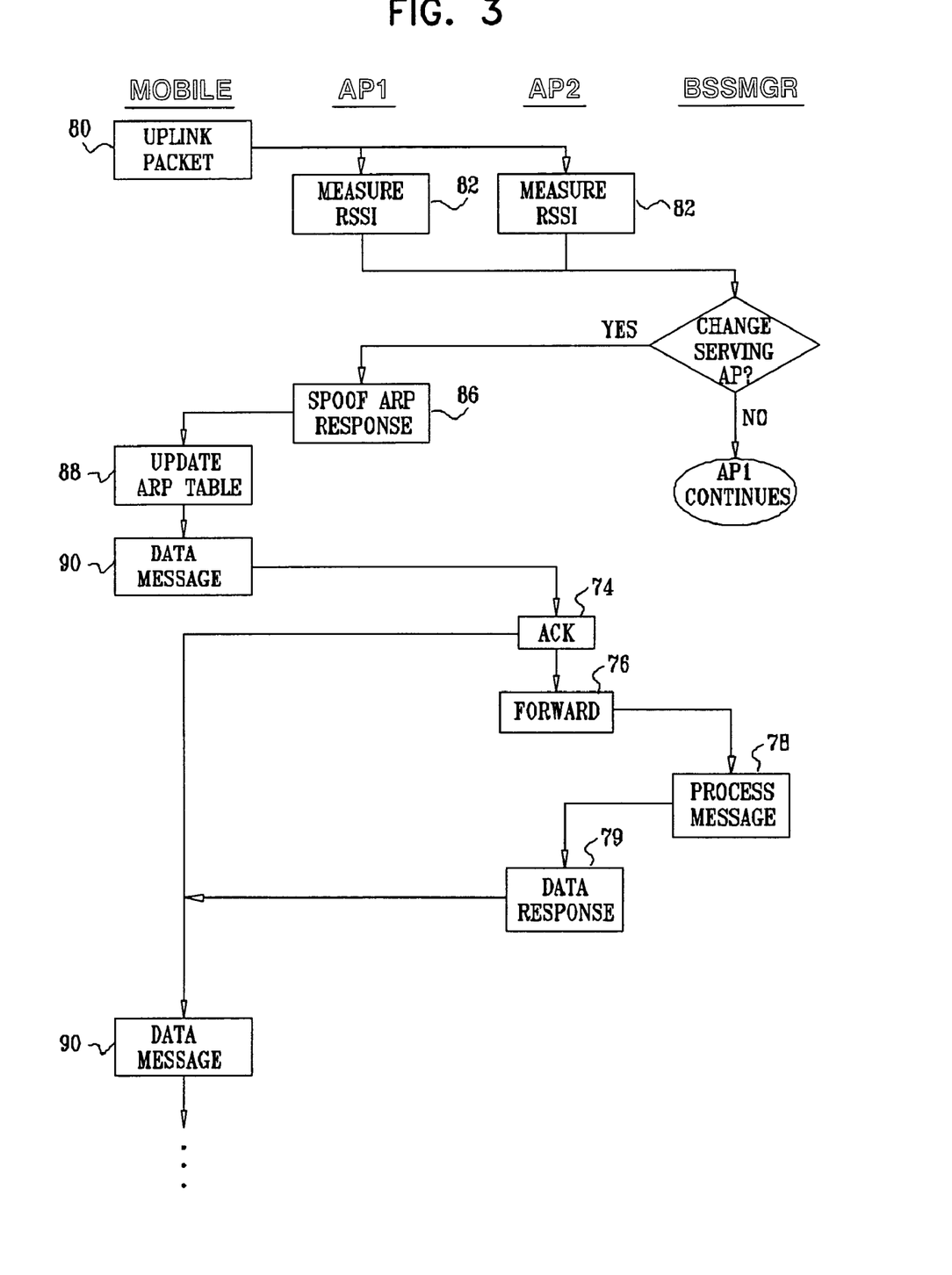
FIG. 3 is a flow chart that schematically illustrates a method for handing over a mobile station from one serving access point to another, in accordance with an embodiment of the present invention.

FIG. 3 is a flow chart that schematically shows a method for handing over mobile station 24 from one access point to another, in accordance with an embodiment of the present invention. The method is again described for simplicity with reference to two access points: AP1 and AP2. It is invoked periodically, when mobile station 24 transmits an uplink packet 80 (which may be either a data frame or a management or control frame). It is assumed initially that AP1 has been selected to serve this mobile station. Nevertheless, all access points receiving the packet measure the received signal strength, at a signal measurement 82. Based on this measurement, each access point transmits a RSSI to manager 30.

Manager 30 compares the RSSI values transmitted by the various access points in order to determine whether a different access point should be selected to serve mobile station 24, instead of AP1, at a handover decision step 84. Typically, if the RSSI value of another access point, such as AP2, is significantly stronger than that of AP1, manager 30 will decide to make the handover. The change in relative signal strengths between AP1 and AP2 may be due to movement of the mobile station within the service region of system 20, for example, or due to other changes, such as movement of people or objects in the service region. Manager 30 may also decide to change the serving access point for a given mobile stations based on other considerations, such as load balancing or network management constraints.

In order to hand over mobile station 24 from AP1 to AP2, the ARP table held by the mobile station must be modified to point to the MAC address of AP2, rather than AP1. For this purpose, manager 30 a spoofed ARP response 86, and conveys the ARP response to AP1 for transmission to the mobile station. (A spoofed ARP response is one that is sent independently of any ARP request from the mobile station. The structure of ARP is such that the recipient of the spoofed ARP response will typically update its ARP table accordingly, even though it has made no ARP request.) Spoofed ARP response 86 instructs mobile station 24 to replace all the entries in its ARP table with new entries containing the MAC address of AP2. Typically, manager 30 maintains a mirror of the ARP table of each mobile station 24, based on the ARP requests received from the mobile station, and thus generates the spoofed ARP response with respect to every one of the entries in the table. Alternatively, manager 30 may generate spoofed ARP responses on the fly, whenever the mobile station sends a packet to AP1 after the handover has taken place. In either case, the mobile station receives the ARP response and updates its ARP table accordingly, at an ARP update step 88.

Thus, the next time mobile station 24 sends a data message 90, the MAC destination address of the data message will be the MAC address of AP2. As a result, AP1 will ignore message 90, while AP2 sends ACK 74, forwards the message to manager 30 at step 76, and returns response 79, as described above.

Figure 4:
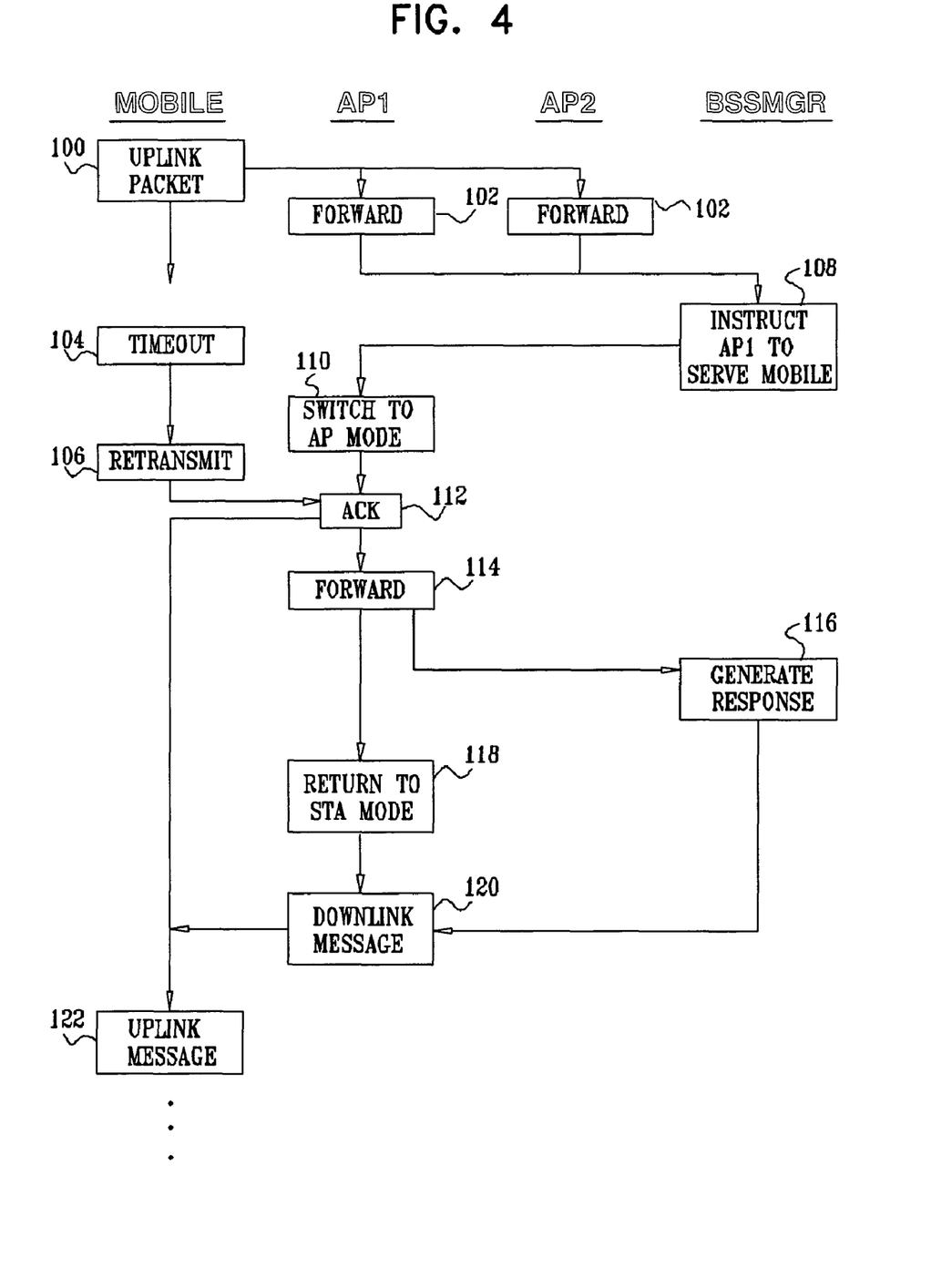
FIG. 4 is a flow chart that schematically illustrates a method for responding to an uplink message from a mobile station, in accordance with an embodiment of the present invention.

FIG. 4 is a flow chart that schematically illustrates a method for responding to an uplink message 100 from mobile station 24, in accordance with an alternative embodiment of the present invention. This method is intended to alleviate the problem of slow response by access points 22, as mentioned above. After transmitting uplink message 100 (such as association request 56 or ARP request 64, for example), mobile station 24 will generate a timeout 104 if it receives no acknowledgment within the predefined time limit, typically 10 µs. The mobile station will then automatically retransmit the uplink message, at a retransmission step 106. This cycle of timeout and retransmission may be repeated until the mobile station finally receives a response, or until the mobile station decides that its connection to WLAN system 20 has failed. Even when such a failure does not occur, the repeated retransmissions consume radio bandwidth in system 20 that could otherwise be used for data transmissions.

Access points AP1 and AP2 forward uplink message 100 to manager 30, at a forwarding step 102, as described above. The manager instructs AP1 to serve mobile station 24, at an instruction step 108. Before actually responding to the uplink message, manager 30 orders access point AP1 to switch from its usual mobile station emulation (STA) mode to an access point (AP) mode, at a mode switching step 110. As noted above, in the station-emulation mode, the access point acknowledges only uplink packets that are directed to its own assigned MAC address. In AP mode, however, the access point acknowledges all uplink messages sent to its assigned BSSID. Therefore, upon receiving the uplink message retransmitted by mobile station 24 at step 106, AP1 immediately returns an acknowledgment 112 to the mobile station, as required by the 802.11 standard. Alternatively, manager 30 may, at step 110, temporarily switch the MAC address of AP1 to correspond to the destination MAC address of uplink message 100, which will likewise cause AP1 to acknowledge the retransmitted uplink message.

Access point AP1 forwards the retransmitted uplink message to manager 30, at a forwarding step 114. The manager prepares response instructions, at a response generation step 116, as described above. Meanwhile, AP1 returns (either autonomously or under instructions from manager 30) to its usual mobile station emulation mode, at a mode restoration step 118. Upon receiving the response instructions from manager 30, AP1 sends a downlink message 120 to mobile station 24. The mobile station may then send a subsequent uplink message 122, and the process continues as described above.

Although the operation of WLAN system 20 is described hereinabove with reference to the 802.11 family of standards, using certain protocols and terminology taken from these and other standards, the principles of the present invention may similarly be applied in wireless LANs of other types, based on other standards and communication protocols. In addition, these principles may be applied in wireless personal area networks (PANs), as defined by IEEE Standard 802.15, including ultra-wide band (UWB) PANs.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for mobile communication, comprising:
arranging a plurality of access points in a wireless local area network (WLAN) to communicate over the air with a mobile station using a common basic service set identification (BSSID) for all the access points;
receiving at one or more of the access points an uplink signal transmitted over the WLAN by the mobile station using the common BSSID;
sending and receiving messages over a communication medium linking the access points in order to select one of the access points to respond to the uplink signal;
transmitting a response from the selected one of the access points to the mobile station; and
assigning a respective medium access control (MAC) address to each of the access points, in addition to the BSSID, for use in communicating with the mobile station and configuring the access points to emulate mobile station communications in handling uplink communications from the mobile station, so that each of the access points acknowledges uplink data messages addressed from the mobile station to the respective MAC address and ignores the uplink data messages that are not addressed to the respective MAC address.

2. The method according to claim 1, wherein the access points are configured to communicate with the mobile station over a common frequency channel shared by all the access points.

3. The method according to claim 2, wherein the access points have respective service areas, and wherein arranging the plurality of the access points comprises arranging the access points so that the service areas substantially overlap.

4. The method according to claim 1, wherein sending and receiving the messages comprises reconfiguring the selected one of the access points temporarily to stop emulating the mobile station communications, so as to transmit an acknowledgment to a management frame transmitted by the mobile station.

5. The method according to claim 1, wherein sending and receiving the messages comprises changing the respective MAC address of the selected one of the access points temporarily, so as to cause the selected one of the access points to transmit an acknowledgment to a management frame transmitted by the mobile station.

6. The method according to claim 1, wherein transmitting the response comprises instructing the mobile station to transmit all the uplink data messages to the respective MAC address of the selected one of the access points.

7. The method according to claim 6, wherein instructing the mobile station comprises sending an Address Resolution Protocol (ARP) response to the mobile station.

8. The method according to claim 7, and comprising, subsequently to transmitting the response from the selected one of the access points, and responsively to a further uplink signal received from the mobile station, selecting a further one of the access points to communicate with the mobile station, and sending a spoofed ARP response to the mobile station instructing the mobile station to transmit all further uplink data messages to the respective MAC address of the further one of the access points.

9. The method according to claim 1, wherein receiving the uplink signal comprises measuring a strength of the uplink signal at each of the one or more of the access points, and wherein sending and receiving the messages comprises indicating in the messages the measured strength of the uplink signal, and selecting the one of the access points to respond to the uplink signal responsively to the strength indicated in the messages.

10. The method according to claim 9, wherein measuring the strength comprises measuring the strength repeatedly in response to subsequent uplink signals transmitted by the mobile station, and wherein selecting the one of the access points comprises selecting a different one of the access points to respond to the subsequent uplink signals, responsively to a change in the measured strength.

11. The method according to claim 1, wherein sending and receiving the messages comprises sending the messages from the access points to a manager node, which processes the messages so as to select the one of the access points to respond to the uplink signal, and sending instructions from the manager node to the selected one of the access points to transmit the response.

12. A method for mobile communication, comprising:
arranging a plurality of access points in a wireless local area network (WLAN) to communicate over the air on a common frequency channel with a mobile station;
receiving at two or more of the access points an uplink signal transmitted over the WLAN by the mobile station on the common frequency channel;
conveying messages responsively to the uplink signal from the two or more of the access points over a communication medium linking the access points to a manager node;
processing the messages at the manager node so as to select one of the access points that received the uplink signal to respond to the uplink signal;
transmitting a response from the selected one of the access points to the mobile station; and
assigning a respective medium access control (MAC) address to each of the access points, in addition to a basic service set identification (BSSID) thereof, for use in communicating with the mobile station and configuring the access points to emulate mobile station communications in handling uplink communications from the mobile station, so that each of the access points acknowledges uplink data messages addressed from the mobile station to the respective MAC address and ignores the uplink data messages that are not addressed to the respective MAC address.

13. The method according to claim 12, wherein the access points have respective service areas, and wherein arranging the plurality of the access points comprises arranging the access points so that the service areas substantially overlap.

14. The method according to claim 12, wherein transmitting the response comprises instructing the selected one of the access points temporarily to stop emulating the mobile station communications, so as to transmit an acknowledgment to a management frame transmitted by the mobile station.

15. The method according to claim 12, wherein transmitting the response comprises changing the respective MAC address of the selected one of the access points temporarily, so as to cause the selected one of the access points to transmit an acknowledgment to a management frame transmitted by the mobile station.

16. The method according to claim 12, wherein transmitting the response comprises instructing the mobile station to transmit all the uplink data messages to the respective MAC address of the selected one of the access points.

17. The method according to claim 16, wherein instructing the mobile station comprises sending an Address Resolution Protocol (ARP) response to the mobile station.

18. The method according to claim 17, and comprising, subsequently to transmitting the response from the selected one of the access points, and responsively to a further uplink signal received from the mobile station, selecting a further one of the access points to communicate with the mobile station, and sending a spoofed ARP response to the mobile station instructing the mobile station to transmit all further uplink data messages to the respective MAC address of the further one of the access points.

19. The method according to claim 12, wherein receiving the uplink signal comprises measuring a strength of the uplink signal at each of the two or more of the access points, and wherein conveying the messages comprises indicating in the messages the measured strength of the uplink signal, and wherein processing the messages comprises selecting the one of the access points to respond to the uplink signal responsively to the strength indicated in the messages.

20. The method according to claim 19, wherein measuring the strength comprises measuring the strength repeatedly in response to subsequent uplink signals transmitted by the mobile station, and wherein selecting the one of the access points comprises selecting a different one of the access points to respond to the subsequent uplink signals, responsively to a change in the measured strength.

21. The method according to claim 12, wherein arranging the plurality of the access points comprises assigning all the access points to the same basic service set (BSS).

22. The method according to claim 12, wherein the manager node comprises a plurality of management processors.

23. The method according to claim 22, wherein the plurality of management processors comprises a control processor and a packet processor, and wherein processing the messages comprises selecting the one of the access points to respond to the uplink signal using the control processor, and further comprises processing uplink data packets received by the selected one of the access points using the packet processor.

24. The method according to claim 23, wherein processing the uplink data packets comprises decrypting the uplink data packets and encrypting downlink data packets at the packet processor, for transmission by the selected one of the access points.

25. The method according to claim 22, wherein processing the messages comprises distributing the messages for processing among the plurality of the management processors.

26. Apparatus for mobile communication, comprising:
a plurality of access points, which are arranged in a wireless local area network (WLAN) to communicate over the air on a common frequency channel with a mobile station using a common basic service set identification (BSSID) for all the access points, and which are adapted, upon receiving at one or more of the access points an uplink signal transmitted over the WLAN by the mobile station on the common frequency channel, to convey messages responsively to the uplink signal from the one or more of the access points over a communication medium linking the access points; and a manager node, linked to the communication medium, which is adapted to process the messages so as to select one of the access points to respond to the uplink signal, and to instruct the selected one of the access points to transmit a response to the mobile station, wherein each of the access points is assigned a respective medium access control (MAC) address, in addition to the BSSID, for use in communicating with the mobile station and is configured to emulate mobile station communications in handling uplink communications from the mobile station, so that each of the access points acknowledges the uplink data messages that are addressed from the mobile station to the respective MAC address and ignores uplink data messages that are not addressed to the respective MAC address.

27. The apparatus according to claim 26, wherein the access points have respective service areas, and are arranged so that the service areas substantially overlap.

28. The apparatus according to claim 26, wherein the manager node is adapted to instruct the selected one of the access points temporarily to stop emulating the mobile station communications, so as to transmit an acknowledgment to a management frame transmitted by the mobile station.

29. The apparatus according to claim 26, wherein the manager node is adapted to temporarily change the respective MAC address of the selected one of the access points, so as to cause the selected one of the access points to transmit an acknowledgment to a management frame transmitted by the mobile station.

30. The apparatus according to claim 26, wherein the selected one of the access points is adapted, under control of the manager node, to instruct the mobile station to transmit all the uplink data messages to the respective MAC address of the selected one of the access points.

31. The apparatus according to claim 30, wherein the selected one of the access points is adapted to instruct the mobile station to transmit all the uplink data messages to a given MAC address by sending an Address Resolution Protocol (ARP) response to the mobile station.

32. The apparatus according to claim 31, wherein the manager node is adapted, subsequently to transmission of the response to the mobile station, and responsively to a further uplink signal received from the mobile station, to select a further one of the access points to communicate with the mobile station, and to cause the selected one of the access points to transmit a spoofed ARP response to the mobile station instructing the mobile station to transmit all further uplink data messages to the respective MAC address of the further one of the access points.

33. The apparatus according to claim 26, wherein the access points are adapted to measure a strength of the uplink signal received at each of the one or more of the access points, and to indicate in the messages conveyed over the communication medium the measured strength of the uplink signal, and wherein the manager node is adapted to select the one of the access points to respond to the uplink signal responsively to the strength indicated in the messages.

34. The apparatus according to claim 33, wherein the access points are adapted to measure the strength repeatedly in response to subsequent uplink signals transmitted by the mobile station, and wherein the manager node is adapted to select a different one of the access points to respond to the subsequent uplink signals, responsively to a change in the measured strength.

35. The apparatus according to claim 26, wherein the manager node comprises a plurality of management processors.

36. The apparatus according to claim 35, wherein the plurality of management processors comprises:
   a control processor, which is adapted to select the one of the access points to respond to the uplink signal; and
   a packet processor, which is adapted to process uplink data packets received by the selected one of the access points.

37. The apparatus according to claim 36, wherein the packet processor is adapted to decrypt the uplink data packets and to encrypt downlink data packets for transmission by the selected one of the access points.

38. The apparatus according to claim 35, wherein the management processors are adapted to process the messages by distributing the messages among the management processors.

* * * * *